(12) United States Patent
Pannuzzo et al.

(10) Patent No.: US 10,844,797 B1
(45) Date of Patent: Nov. 24, 2020

(54) REACTIVATION OF CATALYST FOR LEAN NOX TRAP

(71) Applicant: GM GLOBAL TECHNOLOGY OPERATIONS LLC, Detroit, MI (US)

(72) Inventors: Andrea Pannuzzo, Turin (IT); Giuseppe Previtero, Turin (IT); Isadora Ricci, Turin (IT); Stefano Cantore, Avigliana (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/441,102

(22) Filed: Jun. 14, 2019

(51) Int. Cl.
  *F02D 41/02* (2006.01)
  *F01N 11/00* (2006.01)
  *B01D 53/94* (2006.01)

(52) U.S. Cl.
  CPC ....... *F02D 41/025* (2013.01); *B01D 53/9422* (2013.01); *B01D 53/9495* (2013.01); *F01N 11/002* (2013.01); *F01N 2550/02* (2013.01)

(58) Field of Classification Search
  CPC .. F02D 41/025; F01N 11/002; F01N 2250/02; B01D 53/9495; B01D 53/9422
  See application file for complete search history.

(56) References Cited

U.S. PATENT DOCUMENTS

2011/0265450 A1\* 11/2011 Barasa ................... F01N 9/002
60/274

\* cited by examiner

*Primary Examiner* — Brandon D Lee
(74) *Attorney, Agent, or Firm* — Reising Eithington P.C.

(57) ABSTRACT

Example methods and systems for treating exhaust from an internal combustion engine may generally determine a catalytic converter in an exhaust system is at least partially deactivated by detecting an elevated exhaust temperature and a lean-burn operating condition. In response, a deactivation level of the catalytic converter may be determined, which may be compared with a threshold deactivation level. A magnitude of a temporary rich-fuel operating condition as a response may be determined based upon the comparison. The catalytic converter may be reactivated with the temporary rich-fuel operating condition.

20 Claims, 3 Drawing Sheets

REACTIVATION OF CATALYST FOR LEAN NOX TRAP

INTRODUCTION

Lean air-fuel mixtures may generally reduce fuel consumption of internal combustion (IC) engines, but typically cause increased emissions of nitrogen-oxides (NOx) in an exhaust flow from the engine. Catalytic converters are typically employed to address NOx emissions. In the context of a lean-burn engine system, where the engine reduces relative concentration of fuel in the intake charge below a stoichiometric amount, catalytic converters may be referred to as lean NOx trap (LNT) converters.

Catalytic converters such as LNT converters generally reduce emissions in an exhaust flow, including NOx. Typical three-way catalytic converters generally contain a catalyst material(s) which reduces NOx to nitrogen ($N_2$), oxidizes carbon-monoxide (CO) to carbon-dioxide ($CO_2$), and oxidizes unburnt hydrocarbons (HC) to carbon-dioxide and water ($H_2O$).

When a catalytic converter is exposed to relatively high temperatures in lean-burn conditions, e.g., a diesel particulate filter regeneration process, catalyst performance tends to degrade upon a return to lower exhaust temperatures. For example, deactivation or partial deactivation of the catalyst material in a catalytic converter may increase a light-off temperature of the catalyst material. Accordingly, once exhaust temperatures fall below the (now increased) light-off temperature, NOx emissions may increase. This may cause difficulties in meeting increasingly stringent exhaust requirements, e.g., BIN30, SULEV30, or the like.

Accordingly, there is a need for an improved method and system for reducing NOx emissions with a catalytic converter.

SUMMARY

In at least some examples, a method of treating exhaust from an internal combustion engine may include determining a catalytic converter in an exhaust system is at least partially deactivated by detecting (1) an exhaust temperature above a temperature threshold and (2) an air-fuel equivalence ratio of a hydrocarbon fuel being supplied to the engine is greater than 1.0. The method may further include, in response, determining a deactivation level of the catalytic converter, comparing the determined deactivation level with a threshold deactivation level, and determining a magnitude of a temporary rich-fuel operating condition based upon the comparison. The method may further include reactivating the catalytic converter with the temporary rich-fuel operating condition, the temporary rich-fuel operating condition comprising at least one temporary pulse of the hydrocarbon fuel having an air-fuel equivalence ratio below 1.0.

In some of these examples, a method may also include initially controlling the engine in a lean-burn operating condition, wherein an air-fuel equivalence ratio of a hydrocarbon fuel being supplied to the engine is below 1.0. In some of these particular examples, the engine may be returned to the lean-burn operating condition after the temporary rich-fuel operating condition.

In some examples, the magnitude of the temporary rich-fuel operating condition is a time duration of the temporary rich-fuel operating condition. A greater catalyst deactivation level may, in some of these illustrations, be addressed with a longer time duration of the temporary rich-fuel operating condition.

In other examples, the magnitude of the temporary rich-fuel operating condition is a number of pulses of the hydrocarbon fuel having an air-fuel equivalence ratio below 1.0. In at least a subset of these approaches, a greater catalyst deactivation level is addressed with a greater number of pulses of the hydrocarbon fuel having an air-fuel equivalence ratio below 1.0.

At least some example methods may be applied in the context of a compression-ignition or a diesel engine.

In another example of a method, exhaust from an internal combustion engine may be treated in a method including controlling the engine in a first lean-burn operating condition, wherein an air-fuel equivalence ratio of a hydrocarbon fuel being supplied to the engine is below 1.0, and determining a catalytic converter in an exhaust system is at least partially deactivated by detecting (1) an exhaust temperature above a temperature threshold and (2) an air-fuel equivalence ratio of a hydrocarbon fuel being supplied to the engine is greater than 1.0. A first deactivation level of the catalytic converter may be determined in response. The method may further include comparing the determined first deactivation level with a threshold deactivation level, and determining a first magnitude of a first temporary rich-fuel operating condition based upon this comparison. The method may include reactivating the catalytic converter with the first temporary rich-fuel operating condition, the first temporary rich-fuel operating condition comprising a first number of temporary pulses of the hydrocarbon fuel having an air-fuel equivalence ratio below 1.0, the first number of temporary pulses defining a first time duration. The method may also include controlling the engine in a second lean-burn operating condition following the reactivation of the catalytic converter, wherein an air-fuel equivalence ratio of a hydrocarbon fuel being supplied to the engine is below 1.0, and determining the catalytic converter in the exhaust system is at least partially deactivated by detecting (1) the exhaust temperature above a temperature threshold and (2) the air-fuel equivalence ratio of a hydrocarbon fuel being supplied to the engine is greater than 1.0. A second deactivation level of the catalytic converter may be determined in response, which may be compared with the threshold deactivation level to determine a second magnitude of a second temporary rich-fuel operating condition. The method may include reactivating the catalytic converter with the second temporary rich-fuel operating condition. The second temporary rich-fuel operating condition may comprise a second number of temporary pulses of the hydrocarbon fuel having an air-fuel equivalence ratio below 1.0, the second number of temporary pulses defining a second time duration, wherein the second temporary rich-fuel operating condition is different from the first temporary rich-fuel operating condition such that at least one of the second time duration or the second number of temporary pulses is different from the first time duration or the first number of temporary pulses, respectively.

In some example approaches, the method may further include returning the engine to the lean-burn operating condition after the second temporary rich-fuel operating condition.

Some of the above example methods may be applied in the context of a compression-ignition or a diesel engine.

Example illustrations are also directed to an exhaust system for a vehicle, which may include a catalytic converter positioned in an exhaust tailpipe, the catalytic converter configured to reduce a concentration of a nitrogen-oxide ($NO_x$) present in an exhaust flow through the catalytic converter, and a temperature sensor positioned such that the temperature sensor is configured to determine an operating temperature of the catalytic converter. The system may also include a processor in communication with the temperature sensor. The processor may be configured to determine a catalytic converter in an exhaust system is at least partially deactivated by detecting (1) an exhaust temperature above a temperature threshold and (2) an air-fuel equivalence ratio of a hydrocarbon fuel being supplied to the engine is greater than 1.0, determine a deactivation level of the catalytic converter in response to the determination that the catalytic converter is at least partially deactivated, compare the deactivation level of the catalytic converter with a threshold deactivation level, and determine a magnitude of a temporary rich-fuel operating condition based upon the comparison of the deactivation level of the catalytic converter with the threshold deactivation level. The processor may be further configured to reactivate the catalytic converter with the temporary rich-fuel operating condition, the temporary rich-fuel operating condition comprising at least one temporary pulse of the hydrocarbon fuel having an air-fuel equivalence ratio below 1.0.

The processor may, in some examples, be configured to return the engine to the lean-burn operating condition after the catalytic converter is reactivated.

In at least some example approaches, the magnitude of the temporary rich-fuel operating condition is a time duration of the temporary rich-fuel operating condition. In at least a subset of such examples, a greater catalyst deactivation level may be addressed with a longer time duration of the temporary rich-fuel operating condition.

In some examples, the magnitude of the temporary rich-fuel operating condition is a number of pulses of the hydrocarbon fuel having an air-fuel equivalence ratio below 1.0. In at least some of these approaches, a greater catalyst deactivation level is addressed with a greater number of pulses of the hydrocarbon fuel having an air-fuel equivalence ratio below 1.0.

The processor may, in some examples, be configured to determine different temporary rich-fuel operating conditions in response to different determined deactivation levels of the catalytic converter. In some of these examples, the different temporary rich-fuel operating conditions comprise a plurality of different numbers of pulses of the hydrocarbon fuel having an air-fuel equivalence ratio below 1.0. Alternatively or in addition in these examples, the different temporary rich-fuel operating conditions comprise a plurality of different time durations of the temporary rich-fuel operating conditions.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Example methods and systems described herein may generally detect a deactivation of a catalytic converter. As will be discussed further below, a deactivation of a catalytic converter may occur during a lean-burn engine operation while the catalytic converter is exposed to relatively high temperatures. Deactivation may thus be detected monitoring catalyst temperature and exposure time at that temperature. Additionally, a deactivation level may be determined, which may be used to identify corrective measures to reactivate the catalyst. A deactivation level or extent to which the catalyst has been deactivated may be determined from an exhaust or catalytic converter temperature, an exposure time at the elevated temperature, and also a space velocity or flow rate associated with the exhaust through the catalytic converter. Example reactivation strategies may include a temporary period of an enriched air-fuel ratio, which may include one or more intermittent "pulses" of an enriched air-fuel ratio. A duration of this temporary period, of the pulses individually, and/or a number of the pulses during this period can be adjusted based on the calculated deactivation level. In this manner, degraded catalytic converter performance due to high temperatures and lean-burn conditions may be avoided, particularly with respect to hydrocarbon and carbon monoxide oxidation upon return to relatively colder exhaust temperatures. For example, improving light-off characteristics of the catalytic converter with respect to hydrocarbon (HC) and carbon-monoxide (CO) treatment may create a more exothermic reaction during cold start conditions, thereby leading to enhanced NOx conversion. Moreover, the example methods and systems may facilitate an appropriate response to different levels of deactivation of a catalytic converter.

Figure 1:
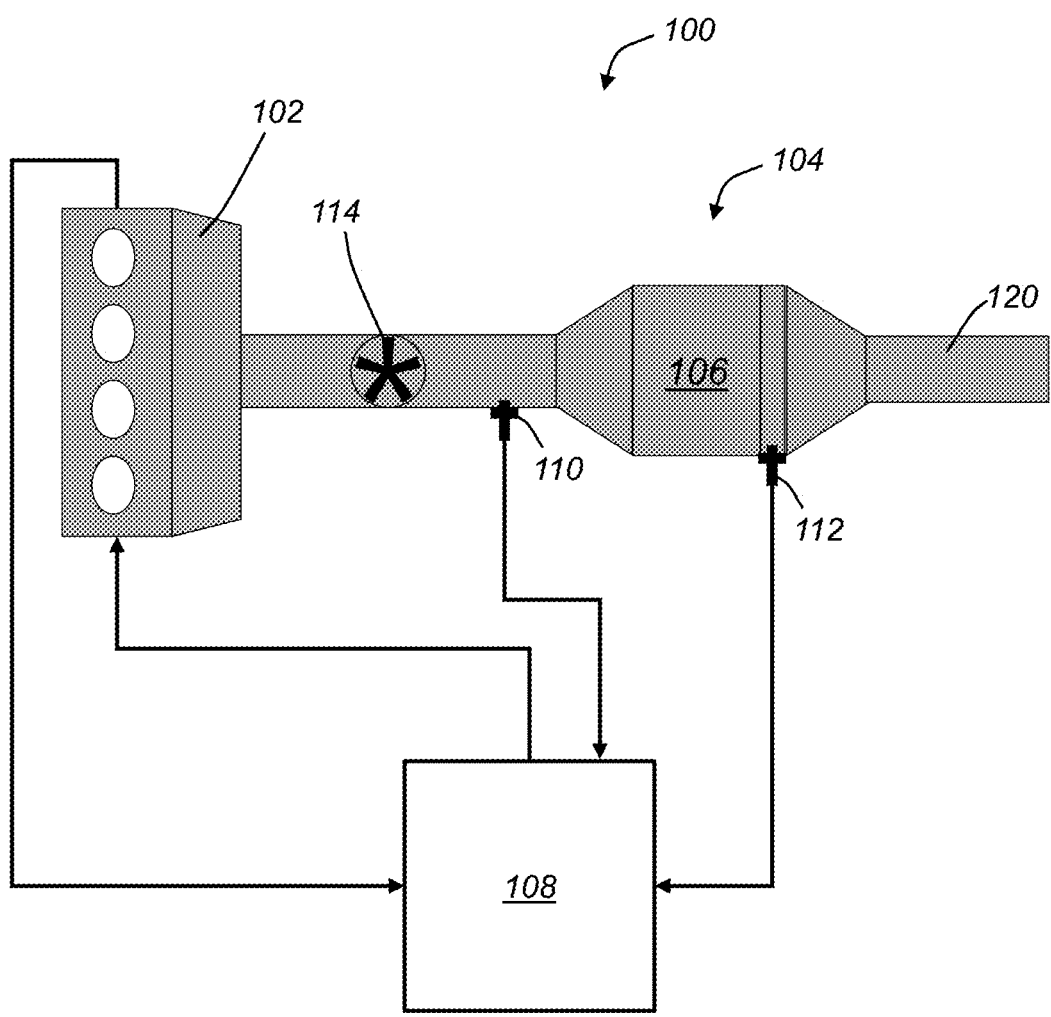
FIG. 1 is a schematic illustration of a vehicle having an exhaust system, according to one example approach.

Turning now to FIG. 1, an example vehicle 100 is illustrated. Vehicle 100 may have an internal combustion engine 102 for providing motive power to one or more wheels (not shown) of the vehicle 100. The engine 102 may be a diesel engine, although the concepts disclosed herein are applicable to other combustion engine types where NOx is produced as a combustion byproduct, e.g., spark-ignition or gasoline engines. The vehicle 100 may rely solely upon the engine 102 for providing power to the vehicle 100, or may alternatively include other power sources, e.g., an electric motor-generator. Thus, the vehicle 100 may be powered exclusively by the engine 102, or may be a hybrid vehicle employing other power sources in addition to the engine 102.

The vehicle 100 may include an exhaust system 104 receiving an exhaust flow from the engine 102. The exhaust system 104 may include one or more pipes or other means of directing exhaust flow from the engine 102 and into the ambient air around the vehicle or otherwise to the atmosphere. Moreover, the exhaust system 104 may include various components for reducing emissions in the exhaust flow before expelling the treated exhaust flow to the atmosphere. As illustrated in FIG. 1, the exhaust system 104 may expel the exhaust flow to a tailpipe 120, which may include one or more mufflers for reducing noise associated with the exhaust flow. The tailpipe 120 may, in turn, expel the exhaust flow into the ambient atmosphere about the vehicle.

The exhaust system 104 may include one or more aftertreatment devices or other components configured to reduce emissions, e.g., nitrogen oxide (NOx) emissions. Reduction of NOx may be accomplished by any devices or systems that are convenient and are not limited to the specific types or examples discussed herein or illustrated in FIG. 1. The example exhaust system 104 illustrated includes a three-way lean-trap catalytic converter 106 (or LNT), which contains a catalyst material that (1) reduces NOx to nitrogen ($N_2$), (2) oxidizes carbon-monoxide (CO) to carbon-dioxide ($CO_2$), and (3) oxidizes unburnt hydrocarbons (HC) to carbon-dioxide and water ($H_2O$). Nevertheless, the catalytic converter 106 may be any type of catalytic converter that reduces NOx present in the exhaust flow, and thus example illustrations are not limited to those employing a three-way converter. In addition to the converter 106, the exhaust system 104 may include any other additional components for reducing emissions or particulates emitted from the engine 102 that are convenient, such as filters, screens, mufflers, or the like.

The exhaust flow from the engine 102 may generally contain sufficient amounts of oxygen necessary for the reactions in the catalytic converter 106. Concentration of oxygen in the exhaust gases from engine 102, and in turn a concentration of oxygen in the converter 106, may vary depending on various factors, such as the engine load and amount of exhaust flow through the exhaust system 104. The catalyst activity of the converter 106 may also increase with temperature. Typically, a minimum exhaust temperature is necessary for a catalyst material within the converter 106 to "light off" and be effective at reducing NOx emissions in the exhaust flow. At elevated temperatures, conversions depend on the catalyst size and design, and generally increase with temperature.

As will be discussed further below, a light-off temperature of the catalytic converter 106 may be affected by periods of operation of the engine 102 in a "lean-burn" configuration, i.e., where an air-fuel equivalence ratio (lambda) is above unity, with elevated temperatures present in the catalytic converter 106. The elevated temperature of the catalytic converter 106 and/or the catalyst therein during lean-burn operation may at least partially "deactivate" the catalytic converter 106, such that the light-off temperature of the catalytic converter 106 with respect to emission reduction performance is increased in one or more of the above-discussed functions of the catalytic converter 106. For example, reductions of hydrocarbons (HC) and carbon-monoxide (CO) may be negatively affected, in addition to negative effects upon reductions in NOx emissions. Accordingly, it may be desirable to take corrective measures, e.g., consistent with the examples below, to "re-activate" the catalytic converter 106, thereby reducing the light-off temperature with respect to one or more of the reactions that take place in the catalytic converter 106.

The air-fuel ratio or equivalence ratio of the engine 102 may also affect production of NOx and the ability of the converter 106 to reduce NOx emissions. Generally, an engine is operated within a relatively narrow band of air-fuel ratios near a stoichiometric point (i.e., where the air-fuel equivalence ratio is unity), and efficiency of the converter 106 tends to fall when an engine is operated outside of a band above or below the stoichiometric point. The engine 102 of FIG. 1 may be operated under a "lean" burn condition, where the air-fuel equivalence ratio is above unity (i.e., relatively reducing the amount of fuel in the intake charge), e.g., in an effort to reduce fuel consumption. However, during lean-burn operation the exhaust flow typically contains excess oxygen, thereby inhibiting the effectiveness of the converter 106 at reducing NOx emissions. As will also be discussed below, at elevated temperatures in a lean-burn operation, light-off temperature of the catalytic converter 106 with respect to one or more of the reactions in the converter 106 may be increased as a negative consequence of high-temperature, lean-burn operating conditions. On the other hand, under "rich" operating conditions where the air-fuel ratio is above the stoichiometric point, unburned fuel may consume some or all of the available oxygen prior to the exhaust flow reaching the catalyst, reducing oxygen available for the oxidation function. The converter 106 may store some oxygen therein, which may provide a buffer for temporary reductions in oxygen levels in an exhaust flow received from the engine 102. As will be discussed below, temporary "pulses" of rich operating conditions may be used to re-activate the catalytic converter 106, i.e., by reducing light-off temperature of the catalyst material therein in an effort to address the increase of the light-off temperature caused by an initial lean-burn operating period.

The exhaust system 104 may include any sensor(s) that may be needed for monitoring conditions, e.g., temperature, pressure, or the like, which may be communicated to a controller 108. The exhaust system 104 may include, for example, a first or upstream sensor 110 that is positioned immediately upstream from the catalytic converter 106. A second or downstream sensor 112 may be positioned immediately downstream of the catalytic converter 106. The sensors 110, 112 may be oxygen sensors configured to detect levels or concentration of oxygen at their respective locations, but may also include sensors for detection of temperature or any other operating parameter(s) that may be convenient.

The exhaust system 104 may also include one or more temperature sensors. Temperature sensors may include one or more thermocouples configured to detect temperature of the exhaust flow at various locations throughout the exhaust system. For example, as illustrated a thermocouple 114 may be positioned immediately downstream from the engine 102 or exhaust manifold. The thermocouple 114 may thus measure a temperature of the exhaust flow as it is emitted from the engine 102 and/or exhaust manifold of the engine 102, as an indication of a temperature of the catalytic converter 106.

The controller 108 may generally monitor operating parameters associated with NOx production and/or the exhaust system 104, and adjust aspects of operation of the vehicle 100. Merely as one example, the controller 108 may be an engine control module (ECM) that adjusts an air-fuel ratio of the engine 102 in response to detected conditions. The controller 108 may therefore be in communication with the components of the exhaust system 104, the engine 102, or other components of the vehicle 100. The controller 108 may generally monitor vehicle operating parameters in real-time. For example, the controller 108 may monitor and/or determine an upstream oxygen temperature (e.g., as measured at the upstream oxygen sensor 110). The controller 108 may also monitor and/or control operating parameters associated with the engine 102, such as a pressure ratio of the engine 102, a derivative or rate of change of the pressure ratio of the engine 102, a mass airflow of the engine 102 (in total or per cylinder), a derivative or rate of change of the mass airflow of the engine 102, a speed of the engine, e.g., in rotations per minute (RPM), a derivative or rate of change of the engine speed, or the air-fuel equivalence ratio of the engine. Any other parameters of the engine 102 and/or the vehicle 100 may be monitored by the controller 108 or otherwise employed that are convenient.

As noted above, the controller 108 may be an ECM of the engine 102. Alternatively, the controller 108 may be a separate controller, or may be embodied in one or more separate controllers of the vehicle 100. The controller 108 may generally a processor and a computer-readable memory, e.g., a non-transitory computer-readable memory, which include instructions that, when executed by the processor, are configured to monitor real-time parameters of the vehicle 100 and/or engine 102, control aspects of the engine 102, exhaust system 104, and the vehicle 100 discussed herein, or the like.

The controller 108 may generally monitor and control an air-fuel ratio or air-fuel equivalence ratio of the engine 102, in addition to any other operating parameters of the engine 102 that are convenient, e.g., by way of one or more fueling sub-controllers. Merely by way of example, a proportional-integral-derivative (PID) controller may be provided for adjusting injector fueling to control an equivalence ratio (i.e., a ratio of the actual air-fuel ratio of the engine 102 to the stoichiometric air-fuel ratio of 14.7:1) of the engine 102. The fueling controller 108 may receive feedback from the upstream oxygen sensor 110 in monitoring the air-fuel equivalence ratio of the engine 102.

As discussed above, exposure of the catalytic converter 106 to elevated temperatures while the engine 102 is operating in a lean-burn configuration may cause the catalytic converter 106 to deactivate at least partially. For purposes of this disclosure and the examples herein, a deactivation of the catalytic converter may be defined as an increase in the light-off temperature of a catalyst material within the catalytic converter 106. Accordingly, example approaches described herein may generally reactivate the catalyst material within the catalytic converter 106.

Light-off temperature of a catalyst material may vary depending upon configuration and design of the catalytic converter 106, as examples. Generally, deactivation of a catalytic converter 106 will cause an increase in light-off temperature, causing decreased effectiveness of the converter 106. The degree to which light-off temperature is increased due to deactivation of a catalytic converter 106 may vary for different applications, and may be determined by subjecting a given catalytic converter 106 to various elevated temperatures for varying amounts of time. Accordingly, while an example is provided below with respect to a baseline light-off temperature of catalytic converter 106 and effects of various deactivation levels on the light-off temperature, a reactivation strategy may generally be determined in part by initially measuring a baseline light-off temperature, and determining a degree to which deactivation occurs at various elevated temperatures and exposure times of the converter. Calibration of a reactivation strategy can therefore take into account the particular deactivation response of a given catalytic converter 106. Moreover, a reactivation strategy may also account for space velocity or mass airflow through the catalytic converter.

In one example, a catalytic converter 106 is initially tested to determine that a baseline light-off temperature is about 140 degrees Celsius (C), i.e., a minimum exhaust temperature of 140 degrees is generally needed in order for the catalyst of the converter 106 to be effective at reducing hydrocarbons in the catalytic converter 106. Upon exposure of the catalytic converter 106 to an exhaust temperature of 350° Celsius for one (1) hour during a lean-burn operation, it is also determined that the light-off temperature has been increased to 160° C. In additional tests, it is found that exposure of the catalytic converter 106 to an exhaust temperature of 450° Celsius during a lean-burn operation for one (1) hour increases the light-off temperature to 180° C., and exposure of the catalytic converter 106 to an exhaust temperature of 550° Celsius during a lean-burn operation for one (1) hour increases the light-off temperature to 200° C. Each of these tests may be used as data points to determine a multiplier used to determine a deactivation level of catalytic converter 106 upon exposure to elevated temperatures and lean-burn operation for a given period of time. For example, the above tests may be used to correlate an operating temperature and exposure time with an expected light-off temperature (i.e., an increase in light-off temperature) of the catalytic converter 106. This expected increase in light-off temperature may be used to determine a multiplier used to determine deactivation level as part of a corrective or reactivation strategy, as will be discussed further below.

Corrective or reactivation strategies may generally include providing one or more temporary pulses of enriched air-fuel mixture to the engine 102. For example, continuing with the example above, in a lean-burn operating condition the engine 102 is determined to be turning at an engine speed of 2000 rotations per minute (RPM) at a pressure of 5.0 bar, with the catalytic converter 106 fluctuating between 300° C. and 380° C. Additionally, an exhaust mass flow through the catalytic converter 106 is determined to be 20.0 grams per second (g/s). Given the above measurements, an example reactivation or temporary rich-condition operating strategy would be a temporary rich condition of a single (i.e., one) rich pulse of five seconds with an air-fuel equivalence ratio ($\lambda$) of 0.95.

In a further example reactivation strategy, the engine 102 is determined to be operating at 2500 RPM at 8.0 bar, with the catalytic converter 106 fluctuating between 340° C. and 420° C. The exhaust mass flow through the catalytic converter 106 is determined to be 40.0 g/s. In this example, a reactivation strategy may include a temporary rich-condition operating period including three (3) rich pulses of an air-fuel equivalence ratio of 0.95 for two (2) seconds each.

The foregoing examples are provided in order to illustrate how a magnitude of a reactivation strategy may be varied. For example, a greater number of pulses of enriched air-fuel mixture may be applied in response to a greater deactivation level. Alternatively or in addition, a greater duration time of the pulses of the enriched air-fuel mixture may be applied in response to a detected larger deactivation level. In this manner, a greater magnitude of a deactivation level may be addressed by a greater magnitude, e.g., proportionally greater, reactivation strategy. Reactivation strategies may generally be calibrated based on different applications and technologies, as determined from testing of a catalytic converter 106.

Figure 2:
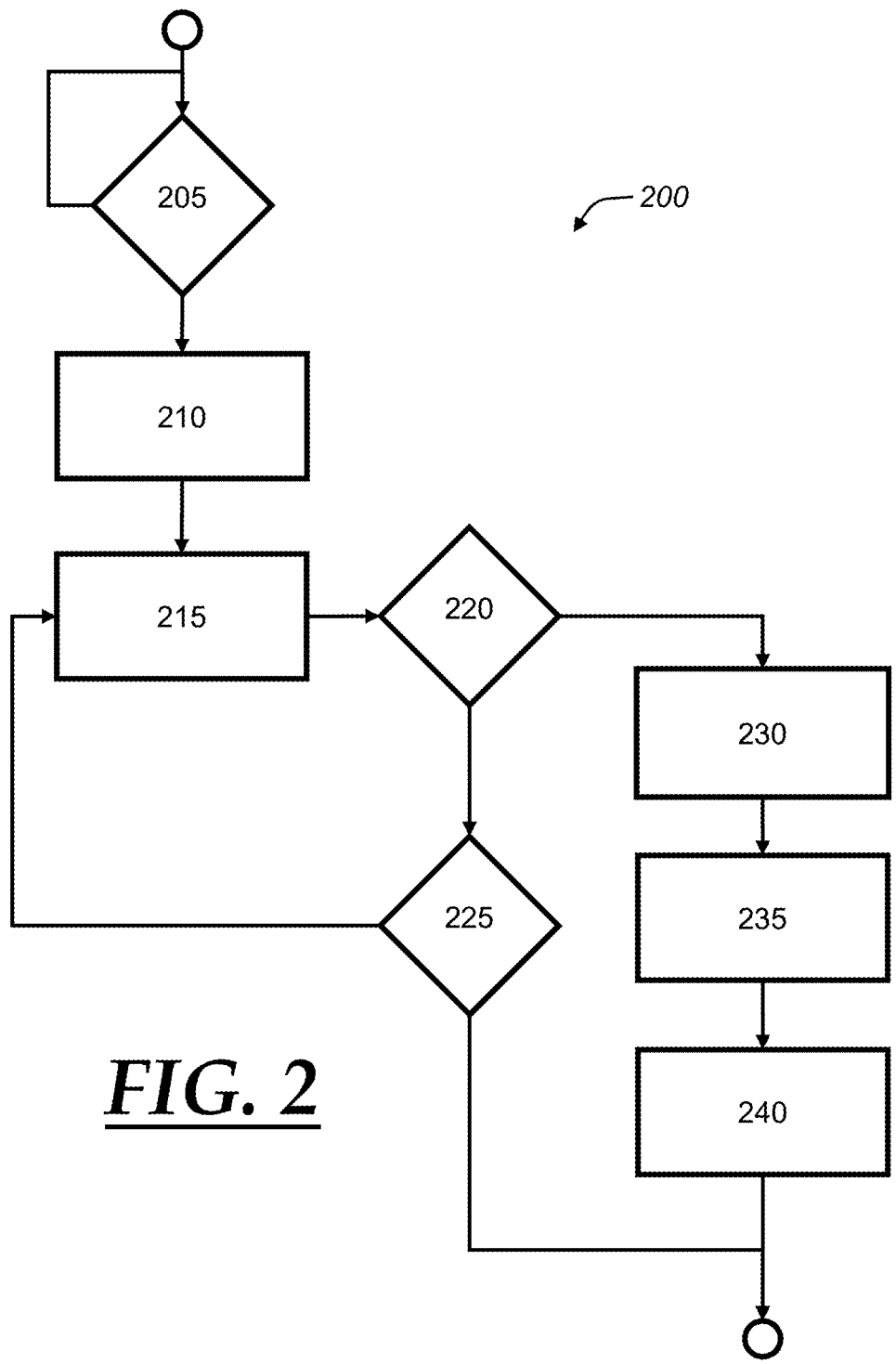
FIG. 2 is a process flow diagram for a method of treating an exhaust flow in a vehicle, according to one example.

Turning now to FIG. 2, an example process flow diagram is illustrated for a process 200 of treating an exhaust flow from an engine in a vehicle. Process 200 may begin at block 205, where process 200 queries whether an exhaust flow is above a first threshold temperature while operating in a lean-burn condition. The first threshold temperature may be selected based upon a normal temperature range for an engine in a lean-burn operation. In one example illustration, 300 degrees Celsius (C) is used as the first or lower temperature threshold. A lean-burn condition may be defined as any condition where an air-fuel equivalence ratio of an engine (i.e., a ratio of the air-fuel ratio to stoichiometric operation, or "lambda" value) is above 1.0. If the exhaust flow temperature is above the first/lower threshold temperature and the engine is operating in a lean-burn condition, process 200 may then proceed to block 210. If, on the other hand, either (1) the exhaust flow temperature is below the first/lower threshold temperature, or (2) the engine is not operating in a lean-burn condition, then process 200 may proceed back to block 205. In this manner, process 200 may generally continuously query whether the initial conditions set forth in block 205 are met.

At block 210, a timer may be started to measure an exposure time of the catalytic converter 106 to elevated temperatures in a lean-burn condition. This timer may be used to determine deactivation level of the catalytic converter 106, as described further below. Process 200 may then proceed to block 215.

At block 215, process 200 may determine a level of deactivation of the catalytic converter, e.g., catalytic converter 106. In one example illustration, a deactivation level represents an exposure time of the catalytic converter 106 and/or a catalyst material within the catalytic converter to high temperatures while the engine 102 is operating under a lean-burn condition. The exposure time may be determined using a multiplier that is dependent upon the temperature, which is applied to exposure time as measured by the timer (of block 210). Typically, higher temperatures may employ a multiplier that increases a calculated exposure time compared with lower temperatures. Multiplier values for various temperatures may be determined from testing of a given catalytic converter 106 (i.e., a specific configuration or design) at various temperature levels, exposure times, space velocity, engine loads, etc.

One example approach to a deactivation level determination will now be described in further detail, with reference to Table 1:

TABLE 1

| Exposure temperature (degrees Celsius) | 350 | 400 | 450 | 500 | 550 | 600 |
|---|---|---|---|---|---|---|
| Deactivation Multiplier | 1.0 | 1.5 | 2.0 | 2.5 | 3.0 | 3.5 |

In the example illustrated in Table 1, a deactivation multiplier may be determined from an exposure temperature associated with the catalytic converter 106 during a lean-burn operating condition. Accordingly, if the catalytic converter 106 is at a temperature of 450 degrees for one hour, Table 1 indicates that a deactivation multiplier of 2.0 is determined. The multiplier may be applied to the exposure time to determine a deactivation level. Thus, continuing with this example, a deactivation level of 2.0 hours (i.e., 1.0 hours×2.0) may be determined for the catalytic converter 106. While the example in Table 1 lists deactivation multipliers in increments of 50 degrees Celsius, example approaches may determine deactivation multipliers for smaller increments (e.g., for each 25 degrees Celsius, or any other increment that is convenient). Deactivation multipliers may be determined from testing of a given design or configuration of the catalytic converter 106, as noted above. More specifically, testing of a given design or configuration of catalytic converter 106 may be used to correlate exposure temperature with appropriate deactivation multipliers, depending on levels of deactivation of a catalytic converter determined from testing.

Proceeding to block 220, process 200 may query whether the deactivation level determined in block 215 is above a threshold deactivation level. A threshold deactivation level may be determined from prior testing of a given configuration or design of a catalytic converter 106. The deactivation level determined in block 215 may be compared with the threshold deactivation level. Merely as one example, a deactivation level of 1.0 hours may be used as a threshold deactivation level, which is then compared with the determined deactivation level.

If the deactivation level of the catalytic converter is below the applicable deactivation threshold level, process 200 may proceed to block 225, where process 200 may query whether the initial threshold temperature and lean-burn conditions are still present. If either condition is not met (i.e., if either exhaust temperature has fallen below the first/lower temperature threshold, or the engine 102 is no longer in a lean-burn operating condition), process 200 may terminate. Alternatively, if both of the initial temperature and lean-burn conditions are still met (i.e., the catalytic converter 106 is continuing to be exposed to potential deactivation), process 200 may proceed back to block 215. In this manner, process 200 may generally continue to query whether the deactivation level of the catalytic converter 106 exceeds a given threshold deactivation level when there is confirmation that the engine operating conditions exposing the catalytic converter 106 to potential deactivation (i.e., temperatures above the deactivation threshold and lean-burn operation) are still present. Accordingly, if either condition is no longer present and the threshold deactivation level has not been reached, no reactivation strategy is needed. This may serve to provide a buffer against reactivation strategy implementation when catalytic converter 106 only briefly experiences elevated temperatures while in a lean-burn operating condition.

If process 200 determines at block 220 that the deactivation level of the catalytic converter is above a given deactivation threshold level, process 200 may proceed to blocks 230-240, where corrective action may be determined and carried out. For example, continuing with the illustration introduced above (i.e., where a deactivation level of 2.0 hours is determined in block 215, and the threshold deactivation level is 1.0 hours), process 200 determines that the deactivation level exceeds the threshold of 1.0 hours and may proceed to block 230.

At block 230, a reactivation strategy may be determined for the catalytic converter. This reactivation strategy may include establishing a temporary rich condition operation including one or more temporary rich pulses in the air-fuel equivalence ratio, e.g., three (3) pulses of two (2) seconds each of an air-fuel equivalence ratio of 0.95. Moreover, different magnitudes of a reactivation strategy may be used in response to different magnitudes of detected deactivation levels. For example, where a greater deactivation level is determined, a greater number of pulses and/or a greater duration time of the application of the pulses or temporary enriched period of engine operation may be used. Accordingly, in some circumstances where a deactivation level of the catalytic converter 106 is only slightly above a threshold deactivation level, a smaller, e.g., proportionally smaller, response may be used in comparison to situations where the catalytic converter 106 far exceeds the threshold deactivation level. Thus, example reactivation strategies described above may employ a shorter duration time of a temporary enriched pulse(s) of an intake mixture having an air-fuel equivalence ratio ($\lambda$) of 0.95 where a deactivation level of a catalytic converter is determined to be relatively smaller, e.g., a duration time of five seconds instead of six seconds. Alternatively or in addition, example reactivation strategies described above may employ a smaller number of temporary enriched pulses of an intake mixture having an air-fuel equivalence ratio ($\lambda$) of 0.95 where a deactivation level of a catalytic converter is determined to be relatively smaller, e.g., a single pulse instead of three separate pulses. It is noted again that appropriate reactivation strategies for various deactivation levels may be determined from initial testing of a catalytic converter 106. Thus, a reactivation strategy in response to a first deactivation of the catalytic converter 106 may be different, e.g., with a different number of distinct enriched pulses or time duration thereof, as compared with a reactivation strategy in response to another deactivation of the catalytic converter 106.

Proceeding to block 235, process 200 may carry out the corrective/reactivation strategy established at block 225. In some examples, a reactivation strategy may be applied to the catalytic converter upon return of the engine 102 to temperatures below the first/lower temperature threshold. Process 200 may then proceed to block 240.

At block 240, process 200 may reset the timer established earlier at block 210, thereby resetting calculation of exposure time of the catalytic converter 106. Process 200 may then terminate.

Figure 3A:
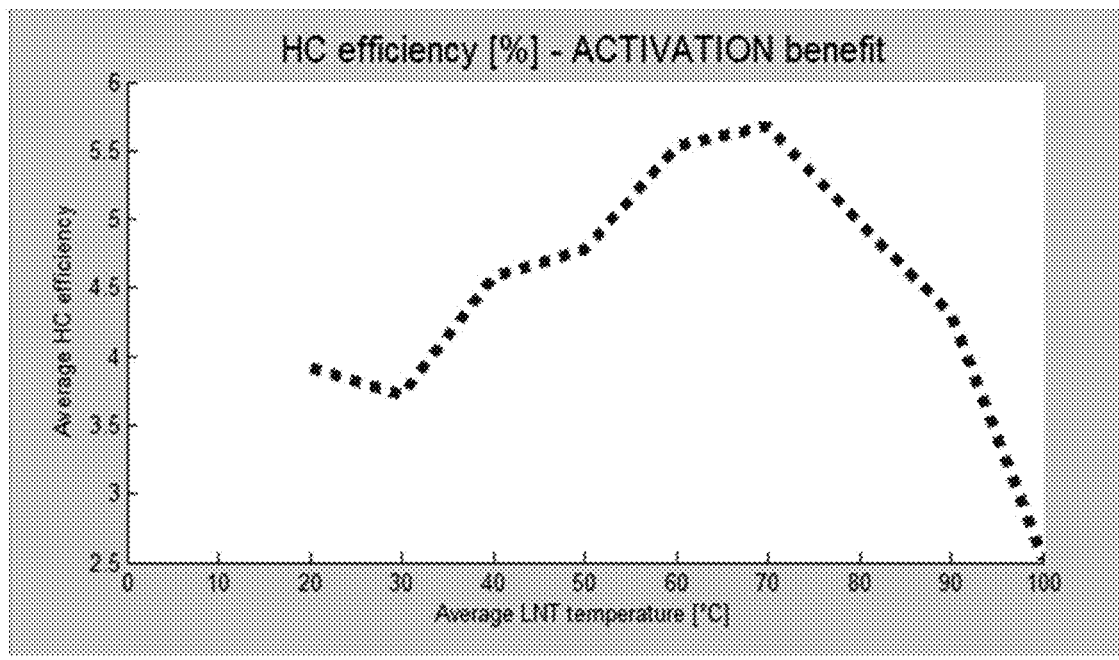
FIG. 3A is a graph illustrating an increase in efficiency of the catalytic converter of FIG. 1 with respect to reduction of hydrocarbon emissions in an exhaust flow.
Figure 3B:
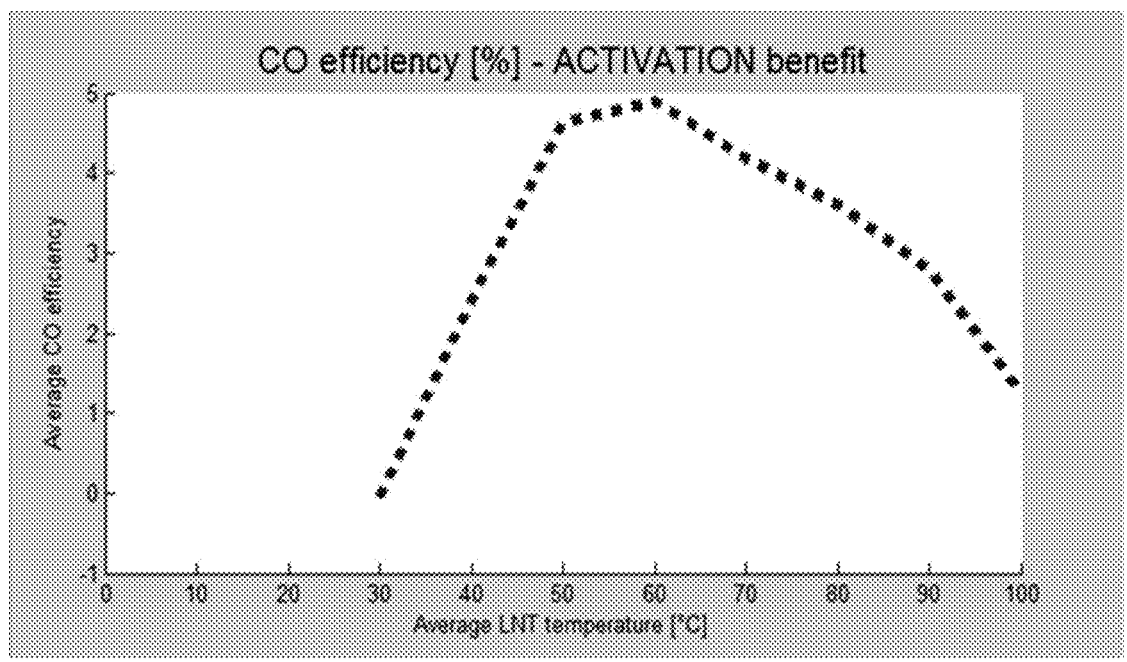
FIG. 3B is a graph illustrating an increase in efficiency of the catalytic converter of FIG. 1 with respect to reduction of carbon-monoxide emissions in an exhaust flow.

Turning now to FIGS. 3A and 3B, improved efficiency of catalytic converter 106 is illustrated with respect to hydrocarbon (HC) and carbon-monoxide (CO) oxidation functions of the catalytic converter 106, as a result of the foregoing example reactivation strategies. As shown in FIG. 3A, an increase in efficiency of an LNT converter such as catalytic converter 106 is shown for hydrocarbon reduction, which is particularly prevalent at lower operating temperatures, e.g., temperatures from 20-100 degrees Celsius. Similarly, in FIG. 3B an increase in efficiency of the LNT converter 106 is shown for carbon monoxide emission reduction at lower operating temperatures, e.g., temperatures from 30-100 degrees Celsius. Accordingly, in comparison to previous approaches where a reactivation strategy is not employed or a deactivation level is otherwise not addressed, the example catalytic converter 106 may generally provide increased efficiency with respect to reactions within the catalytic converter (particularly at lower or startup operating temperatures of the catalytic converter), e.g., hydrocarbon and/or carbon monoxide reduction, by employing a reactivation strategy consistent with the foregoing examples.

Example methods and systems may reactivate a catalyst material in a catalytic converter that is at least partially deactivated, e.g., as a result of high temperatures present in/around a catalytic converter while an engine is operating using a lean-burn fueling strategy. Accordingly, NOx emissions may be reduced using a reactivation strategy where a temporarily enriched air-fuel mixture comprising one or more pulses of a relatively enriched air-fuel mixture is supplied to the engine, thereby improving performance of a catalytic converter with respect to NOx emissions. Moreover, example reactivation strategies may have a magnitude determined based upon a deactivation level of the catalytic converter, such that a more or less significant reactivation strategy is employed in response to a larger or smaller deactivation level that is detected, respectively.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of treating exhaust from an internal combustion engine, comprising:
    (a) determining a catalytic converter in an exhaust system is at least partially deactivated by detecting (1) an exhaust temperature above a temperature threshold and (2) an air-fuel equivalence ratio of a hydrocarbon fuel being supplied to the engine is greater than 1.0;
    (b) determining a deactivation level of the catalytic converter in response to the determination in step (a);
    (c) comparing the deactivation level determined in step (b) with a threshold deactivation level;
    (d) determining a magnitude of a temporary rich-fuel operating condition based upon the comparison in step (c); and
    (e) reactivating the catalytic converter with the temporary rich-fuel operating condition, the temporary rich-fuel operating condition comprising at least one temporary pulse of the hydrocarbon fuel having an air-fuel equivalence ratio below 1.0.

2. The method of claim 1, further comprising:
    prior to step (a), controlling the engine in a lean-burn operating condition, wherein an air-fuel equivalence ratio of a hydrocarbon fuel being supplied to the engine is below 1.0.

3. The method of claim 2, further comprising:
    after the temporary rich-fuel operating condition in step (e), returning the engine to the lean-burn operating condition.

4. The method of claim 1, wherein the magnitude of the temporary rich-fuel operating condition is a time duration of the temporary rich-fuel operating condition.

5. The method of claim 4, wherein a greater catalyst deactivation level is addressed with a longer time duration of the temporary rich-fuel operating condition.

6. The method of claim 1, wherein the magnitude of the temporary rich-fuel operating condition is a number of pulses of the hydrocarbon fuel having an air-fuel equivalence ratio below 1.0.

7. The method of claim 6, wherein a greater catalyst deactivation level is addressed with a greater number of pulses of the hydrocarbon fuel having an air-fuel equivalence ratio below 1.0.

8. The method of claim 1, wherein the engine is a diesel engine and the catalytic converter is a lean nitrogen-oxide (NOx) trap converter.

9. A method of treating exhaust from an internal combustion engine, comprising:
    (a) controlling the engine in a first lean-burn operating condition, wherein an air-fuel equivalence ratio of a hydrocarbon fuel being supplied to the engine is below 1.0;
    (b) determining a catalytic converter in an exhaust system is at least partially deactivated by detecting (1) an exhaust temperature above a temperature threshold and (2) the air-fuel equivalence ratio of the hydrocarbon fuel being supplied to the engine is greater than 1.0;
    (c) determining a first deactivation level of the catalytic converter in response to the determination in step (b);
    (d) comparing the first deactivation level determined in step (c) with a threshold deactivation level;

(e) determining a first magnitude of a first temporary rich-fuel operating condition based upon the comparison in step (d);

(f) reactivating the catalytic converter with the first temporary rich-fuel operating condition, the first temporary rich-fuel operating condition comprising a first number of temporary pulses of the hydrocarbon fuel having an air-fuel equivalence ratio below 1.0, the first number of temporary pulses defining a first time duration;

(g) controlling the engine in a second lean-burn operating condition following the reactivation of the catalytic converter in step (f), wherein the air-fuel equivalence ratio of the hydrocarbon fuel being supplied to the engine is below 1.0;

(h) determining the catalytic converter in the exhaust system is at least partially deactivated by detecting (1) the exhaust temperature above a temperature threshold and (2) the air-fuel equivalence ratio of the hydrocarbon fuel being supplied to the engine is greater than 1.0;

(i) determining a second deactivation level of the catalytic converter in response to the determination in step (h);

(j) comparing the second deactivation level determined in step (i) with the threshold deactivation level;

(k) determining a second magnitude of a second temporary rich-fuel operating condition based upon the comparison in step (i); and (l) reactivating the catalytic converter with the second temporary rich-fuel operating condition, the second temporary rich-fuel operating condition comprising a second number of temporary pulses of the hydrocarbon fuel having an air-fuel equivalence ratio below 1.0, the second number of temporary pulses defining a second time duration, wherein the second temporary rich-fuel operating condition is different from the first temporary rich-fuel operating condition such that at least one of the second time duration or the second number of temporary pulses is different from the first time duration or the first number of temporary pulses, respectively.

10. The method of claim 9, further comprising:
after the second temporary rich-fuel operating condition in step (1), returning a engine to the lean-burn operating condition.

11. The method of claim 9, wherein the engine is a diesel engine and the catalytic converter is a lean nitrogen-oxide (NOx) trap converter.

12. An exhaust system for a vehicle, comprising:
a catalytic converter positioned in an exhaust tailpipe, the catalytic converter configured to reduce a concentration of a nitrogen-oxide ($NO_x$) present in an exhaust flow through the catalytic converter;
a temperature sensor positioned such that the temperature sensor is configured to determine an operating temperature of the catalytic converter; and
a processor in communication with the temperature sensor, the processor configured to:
determine the catalytic converter in the exhaust system is at least partially deactivated by detecting (1) an exhaust temperature above a temperature threshold and (2) an air-fuel equivalence ratio of a hydrocarbon fuel being supplied to the engine is greater than 1.0;
determine a deactivation level of the catalytic converter in response to the determination that the catalytic converter is at least partially deactivated;
compare the deactivation level of the catalytic converter with a threshold deactivation level;
determine a magnitude of a temporary rich-fuel operating condition based upon the comparison of the deactivation level of the catalytic converter with the threshold deactivation level; and
reactivate the catalytic converter with the temporary rich-fuel operating condition, the temporary rich-fuel operating condition comprising at least one temporary pulse of the hydrocarbon fuel having an air-fuel equivalence ratio below 1.0.

13. The exhaust system of claim 12, wherein the processor is configured to return the engine to a lean-burn operating condition after the catalytic converter is reactivated.

14. The exhaust system of claim 12, wherein the magnitude of the temporary rich-fuel operating condition is a time duration of the temporary rich-fuel operating condition.

15. The exhaust system of claim 14, wherein a greater catalyst deactivation level is addressed with a longer time duration of the temporary rich-fuel operating condition.

16. The exhaust system of claim 12, wherein the magnitude of the temporary rich-fuel operating condition is a number of pulses of the hydrocarbon fuel having an air-fuel equivalence ratio below 1.0.

17. The exhaust system of claim 16, wherein a greater catalyst deactivation level is addressed with a greater number of pulses of the hydrocarbon fuel having an air-fuel equivalence ratio below 1.0.

18. The exhaust system of claim 12, wherein the processor is configured to determine different temporary rich-fuel operating conditions in response to different determined deactivation levels of the catalytic converter.

19. The exhaust system of claim 18, wherein the different temporary rich-fuel operating conditions comprise a plurality of different numbers of pulses of the hydrocarbon fuel having an air-fuel equivalence ratio below 1.0.

20. The exhaust system of claim 18, wherein the different temporary rich-fuel operating conditions comprise a plurality of different time durations of the temporary rich-fuel operating conditions.

* * * * *